Patented June 4, 1940

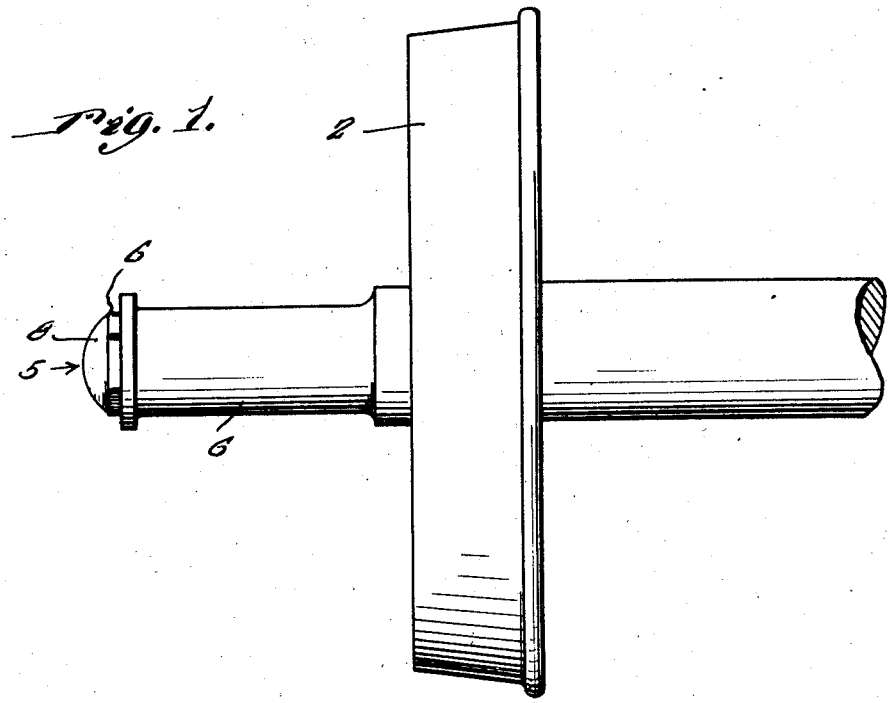
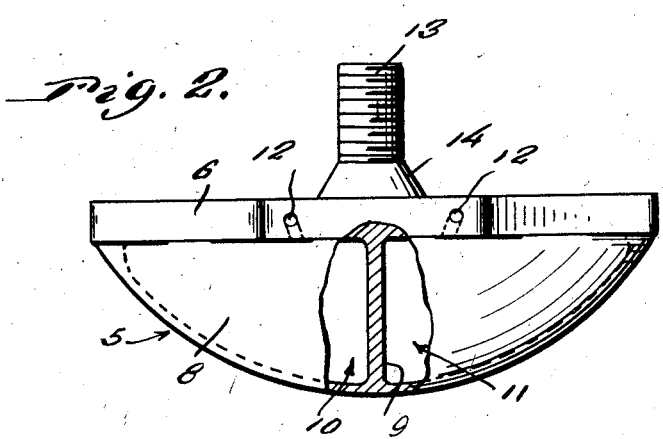
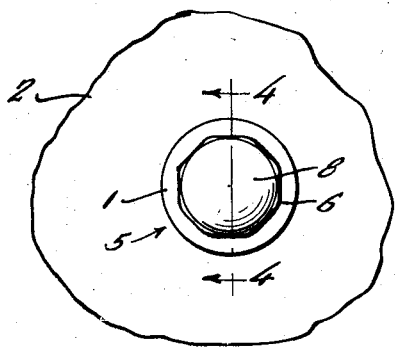

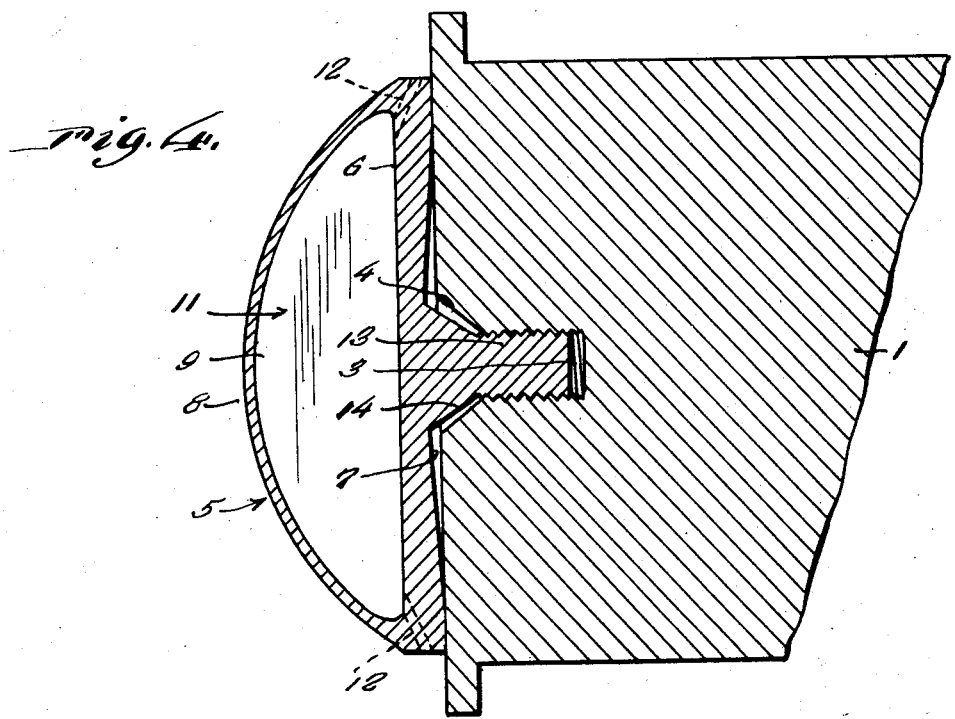
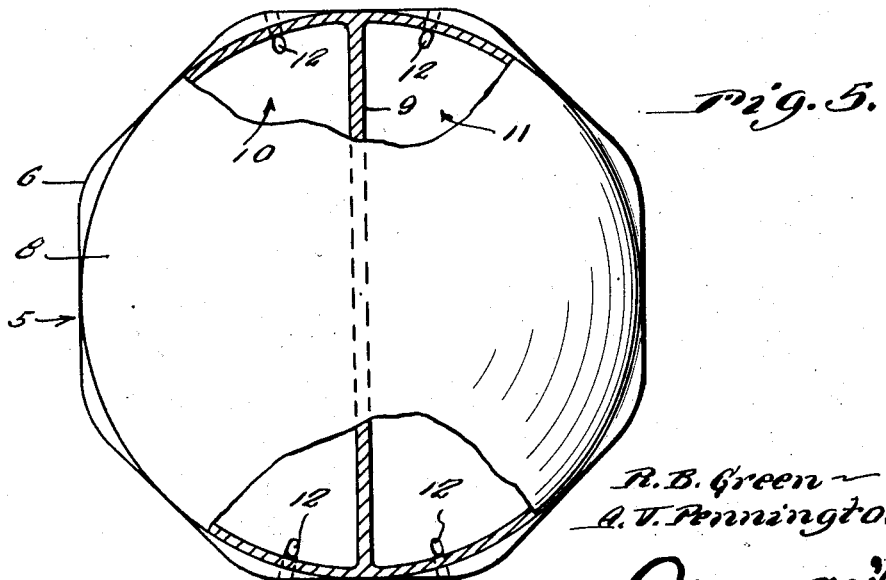

2,203,051

UNITED STATES PATENT OFFICE 2,203,051

HEAT DETECTOR

Roscoe Bartlett Green, Peoria, and Alfred V. Pennington, East Peoria, Ill.

Application May 4, 1938, Serial No. 206,096

1 Claim. (Cl. 116—114)

The present invention relates to new and useful improvements in heat detectors particularly for the axles of railway rolling stock, shafts, bearings, etc., and has for its primary object to provide, in a manner as hereinafter set forth, a device embodying novel means for indicating when the temperature of the axle, shaft or other structure to which said device is applied rises abnormally, as from lubrication failure or other causes.

Another very important object of the invention is to provide a heat detector of the aforementioned character which is adapted to give both visible and scent signals in the event of an abnormal rise in the temperature of the axle, shaft, etc.

Still another very important object of the invention is to provide a heat detector of the character described comprising a novel construction and arrangement whereby said detector may be expeditiously installed on the axle or shaft.

Other objects of the invention are to provide a heat detector of the character described which will be comparatively simple in construction, strong, durable, highly efficient and reliable in use, compact and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein:

Figure 1 is an elevational view, showing an embodiment of the present invention installed on one end of an axle.

Figure 2 is a plan view of the device, a portion thereof being broken away in section.

Figure 3 is an end view of the axle with the device mounted thereon.

Figure 4 is a view in vertical longitudinal section through an end portion of the axle and the device constituting the present invention.

Figure 5 is an elevational view of the invention with portions thereof broken away in section.

Referring now to the drawings in detail, it will be seen that the reference numeral 1 designates an end portion of a conventional railway car axle having fixed thereon the usual wheel 2. As illustrated to advantage in Fig. 4 of the drawings, the axle 1 has formed longitudinally in the end thereof a centrally located threaded socket 3. The socket 3 includes a smooth, tapered outer portion 4.

The reference numeral 5 designates a substantially dome shaped container which is adapted to be mounted on the end of the axle 1. It may be well to here state that the mounting of the invention on each end of the axle is contemplated. The container 5 is of suitable metal and comprises a polygonal plate 6 having a substantially concave face 7 which is engageable with the end of the axle 1. The container 5 further includes a substantially cup shaped portion 8 on the plate 6. A partition 9 divides the container 5 into compartments or chambers 10 and 11.

One of the chambers in the container 5 is for the reception of a suitable smoke generating chemical, when subjected to heat, and the other of said chambers is for the reception of a suitable chemical which, when heated, produces a very strong and distinctive odor. Inclined ports 12 from the periphery of the polygonal plate 6 communicate with the chambers 10 and 11, said ports being closed by a suitable fusible medium, such as solder.

Projecting from the face 7 of the plate 6 is an integral shank 13 which screws into the socket 3. The shank 13 comprises a smooth, tapered inner portion 14, which the portion 4 of the socket 3 accommodates (see Figure 4 of the drawings).

It is thought that the operation of the device will be readily apparent from a consideration of the foregoing. When the temperature of the axle rises to an abnormal degree the heat is, of course, transferred to the container 5 and the chemicals in the chambers 10 and 11. This heat melts the fusible elements in the ports 12, thus opening the chambers 10 and 11. The already heated chemicals in the chambers 10 and 11 then flow through the ports 12 and are thrown on the adjacent hot surfaces of the journal box and smoke is thus generated from one of said chemicals and an odoriferous gas from the other. These signals will be noted by the train crew or others in time to permit the difficulty to be remedied before the temperature rises to such a degree as to damage the axle or journal and, as frequently occurs, causes a derailment and wreck as a result thereof. The polygonal plate 6 is adapted to receive a conventional wrench or other suitable tool for screwing the shank 13 tightly in the socket 3. The concavity 7 in the plate 6 permits the central portion of said plate to be drawn toward the end of the axle 1 as the shank 13 is tightened in the socket 3, thus bringing additional pressure to bear on the marginal portions of the plate where it contacts the axle for preventing loosening. This is shown to advantage in Fig. 4 of the drawings.

It is believed that the many advantages of a heat detector constructed in accordance with the present invention will be readily understood and although a preferred embodiment of the device is as illustrated and described, it is to be understood that changes in the details of construction may be resorted to which will fall within the scope of the invention as claimed.

What is claimed is:

The combination with a mechanical element that is subjected to heat, said element having a threaded socket therein, of a container for the reception of a gas generating medium, said container including a plate having a substantially concave face, said container having a plurality of discharge ports therein adjacent the marginal portions of said plate, fusible elements closing the discharge ports, and a shank projecting from the concave face of the plate and threaded into the socket, said shank constituting means for mounting the container on the mechanical element and for pressing only the marginal portions of the plate thereagainst.

ROSCOE B. GREEN.
ALFRED V. PENNINGTON.